(12) United States Patent
Yamafuku et al.

(10) Patent No.: US 10,003,061 B2
(45) Date of Patent: Jun. 19, 2018

(54) ENERGY STORAGE DEVICE AND METHOD OF MANUFACTURING ENERGY STORAGE DEVICE

(71) Applicant: GS Yuasa International Ltd., Kyoto-shi (JP)

(72) Inventors: Taro Yamafuku, Kyoto (JP); Sumio Mori, Kyoto (JP)

(73) Assignee: GS YUASA INTERNATIONAL LTD., Kyoto-Shi, Kyoto (JP)

( * ) Notice: Subject to any disclaimer, the term of this patent is extended or adjusted under 35 U.S.C. 154(b) by 130 days.

(21) Appl. No.: 14/731,284

(22) Filed: Jun. 4, 2015

(65) Prior Publication Data

US 2015/0357670 A1 Dec. 10, 2015

(30) Foreign Application Priority Data

Jun. 9, 2014 (JP) .................................. 2014-118694

(51) Int. Cl.
*H01M 2/02* (2006.01)
*H01M 2/12* (2006.01)
(Continued)

(52) U.S. Cl.
CPC .............. *H01M 2/18* (2013.01); *H01G 11/20* (2013.01); *H01G 11/58* (2013.01); *H01G 11/80* (2013.01); *H01M 2/0473* (2013.01); *H01M 2/14* (2013.01); *H01M 2/365* (2013.01); *H01M 10/0431* (2013.01); *H01M 2/0217* (2013.01);
(Continued)

(58) Field of Classification Search
CPC ......... H01M 10/0431; H01M 10/0587; H01M 10/0525; H01M 2/14; H01M 2/365; H01M 2/0217; H01M 2/1235; H01M 2/18; H01M 2/36; H01M 2/0473; H01G 11/80;
(Continued)

(56) References Cited

U.S. PATENT DOCUMENTS 6,083,640 A * 7/2000 Lee ..................... H01M 2/0277
429/161
2009/0291330 A1 * 11/2009 Onnerud ............. H01M 2/0275
429/7
(Continued)

FOREIGN PATENT DOCUMENTS

JP 10-241741 A 9/1998
JP 2004-022502 A 1/2004
(Continued)

*Primary Examiner* — Eugenia Wang
(74) *Attorney, Agent, or Firm* — McGinn IP Law Group, PLLC

(57) ABSTRACT

An energy storage device includes: an electrode assembly; a case for storing the electrode assembly therein, the case having an electrolyte solution sealing portion where an electrolyte solution pouring hole formed in the case is sealed; and at least one partition member arranged in a gap formed between the case and the electrode assembly stored in the case. The partition member partitions the gap in the winding axis direction of the electrode assembly by surrounding the electrode assembly in the winding direction of the electrode. The electrolyte solution pouring hole is arranged at a position closer to one end of the electrode assembly than the partition member close to one end of the case is in the winding axis direction.

18 Claims, 12 Drawing Sheets

(51) Int. Cl.
*H01M 2/18* (2006.01)
*H01M 2/04* (2006.01)
*H01M 2/36* (2006.01)
*H01G 11/80* (2013.01)
*H01G 11/20* (2013.01)
*H01G 11/58* (2013.01)
*H01M 10/04* (2006.01)
*H01M 2/14* (2006.01)
*H01M 10/0525* (2010.01)
*H01M 10/0587* (2010.01)

(52) U.S. Cl.
CPC ...... *H01M 2/1235* (2013.01); *H01M 10/0525* (2013.01); *H01M 10/0587* (2013.01); *Y02E 60/13* (2013.01); *Y10T 29/4911* (2015.01)

(58) Field of Classification Search
CPC ........ H01G 11/20; H01G 11/58; Y02E 60/13; Y10T 29/4911
See application file for complete search history.

(56) References Cited

U.S. PATENT DOCUMENTS

| | | | |
|---|---|---|---|
| 2011/0052976 A1* | 3/2011 | Ishii | H01M 2/22 429/178 |
| 2012/0088146 A1* | 4/2012 | Byun | H01M 10/02 429/163 |
| 2013/0244090 A1 | 9/2013 | Tanaka et al. | |
| 2013/0323557 A1* | 12/2013 | Ariga | H01M 10/0587 429/94 |
| 2015/0064550 A1 | 3/2015 | Kawasaki et al. | |

FOREIGN PATENT DOCUMENTS

| | | | | |
|---|---|---|---|---|
| JP | 2005-251738 A | 9/2005 | | |
| JP | 2011-054539 A | 3/2011 | | |
| JP | 2012-160312 A | 8/2012 | | |
| JP | WO 2012127623 A1 * | 9/2012 | ........ | H01M 10/0587 |
| JP | 2013-168239 A | 8/2013 | | |
| JP | 2013-219027 A | 10/2013 | | |
| JP | 5336023 B1 | 11/2013 | | |
| JP | 2013-251123 A | 12/2013 | | |

* cited by examiner

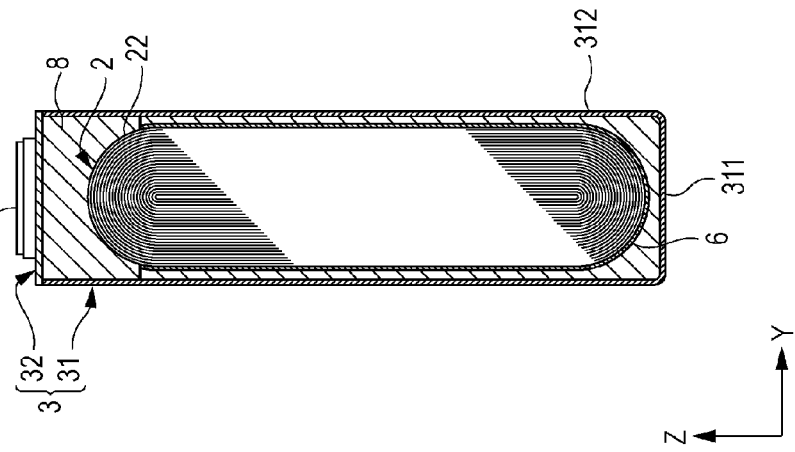
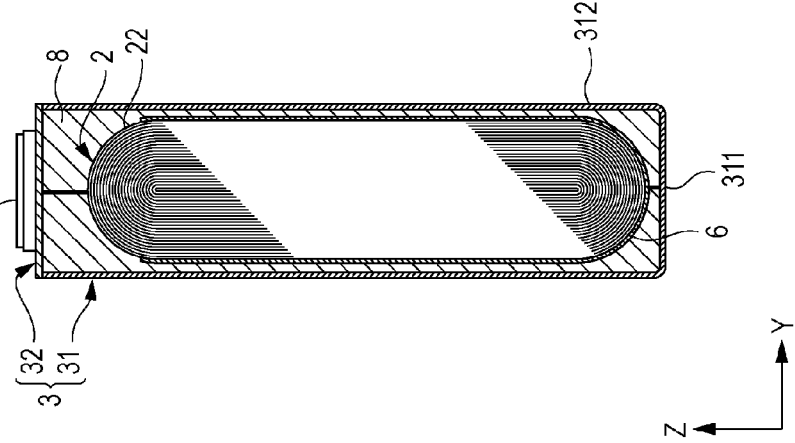
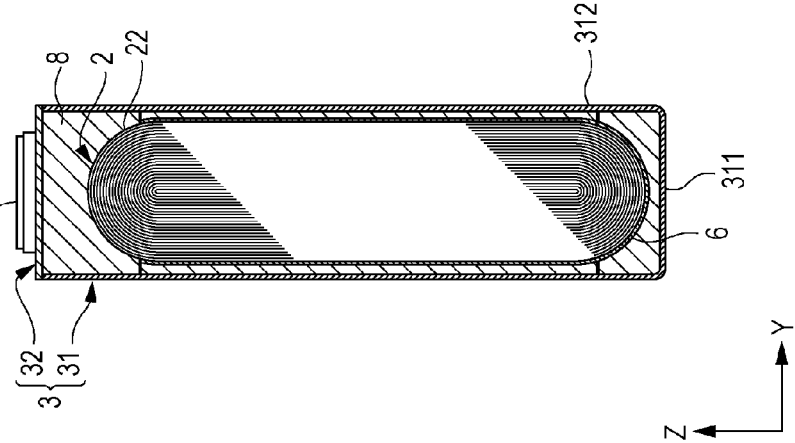

ENERGY STORAGE DEVICE AND METHOD OF MANUFACTURING ENERGY STORAGE DEVICE

CROSS-REFERENCE TO RELATED APPLICATIONS

This application claims the benefit of Japanese patent application No. 2014-118694, filed on Jun. 9, 2014, which is incorporated by reference.

FIELD

The present invention relates to an energy storage device provided with an electrode assembly formed by winding electrodes and a separator, and a method of manufacturing an energy storage device.

BACKGROUND

Conventionally, there has been known a nonaqueous electrolyte secondary battery provided with a wound-type electrode assembly (see JP-A-2013-219027). To be more specific, the nonaqueous electrolyte secondary battery includes: an electrode assembly formed by winding an electrode having positive polarity (positive electrode), an electrode having negative polarity (negative electrode), and a separator; a battery container which houses the electrode assembly together with an electrolyte solution; a lid which is a lid for closing an opening of the battery container and in which an electrolyte solution pouring port is formed; and a sealing plug which seals the electrolyte solution pouring port. In the electrode assembly, strip-like electrodes and strip-like separator are wound around in an alternately layered state.

In manufacturing steps of the above-mentioned nonaqueous electrolyte secondary battery, the opening formed in the battery container in which the electrode assembly is stored is closed by the lid, the electrolyte solution is poured in the battery container through the electrolyte solution pouring port formed in the lid and, thereafter, the electrolyte solution pouring port is sealed by the sealing plug. In the battery container, the poured electrolyte solution impregnates (infiltrates) into the electrode assembly. The impregnation of the electrolyte solution is specifically described below.

The electrode assembly is formed by winding the electrodes and the separator in a layered state. Accordingly, the electrolyte solution poured in the battery container impregnates into spaces formed between the electrodes and the separator wound in a layered state from an end portion of the electrode assembly in the winding axis direction. In this case, the electrolyte solution infiltrates into the inside of the electrode assembly from both ends of the electrode assembly in the winding axis direction respectively and hence, a part of a gas such as air present in a space between the electrode and the separator may not be discharged from the space between the electrode and the separator (that is, a part of the gas may be confined in a center portion of the electrode assembly by the electrolyte solution which impregnates into the inside of the electrode assembly from both end of the electrode assembly), and may be left at the center portion of the electrode assembly in the winding axis direction.

In this case, the electrolyte solution may not impregnate into the inside of the whole electrode assembly uniformly and hence, a formed state of a negative electrode protection film (solid electrolyte interface: SEI) in the inside of the electrode assembly may become non-uniform. In a portion of the electrode assembly where the formation of the negative electrode protection film is insufficient, charge-discharge is repeated in the nonaqueous electrolyte secondary battery and hence, an irreversible reaction is liable to progress in such a portion compared with other portions.

SUMMARY

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

An object of the present invention is to provide an energy storage device in which the impregnation of an electrolyte solution into the inside of an electrode assembly is unlikely to become non-uniform, and a method of manufacturing an energy storage device.

An energy storage device according to an aspect of the present invention includes: an electrode assembly formed by winding electrodes and a separator in a layered state; a case for storing the electrode assembly therein, the case having an electrolyte solution sealing portion where an electrolyte solution pouring hole formed in the case is sealed; and at least one partition member arranged in a gap formed between the case and the electrode assembly stored in the case, wherein the partition member partitions the gap in the winding axis direction of the electrode assembly by surrounding the electrode assembly in the winding direction of the electrode, and the electrolyte solution pouring hole is arranged at a position closer to one end of the electrode assembly than the partition member is in the winding axis direction.

BRIEF DESCRIPTION OF DRAWINGS

The foregoing and other features of the present invention will become apparent from the following description and drawings of an illustrative embodiment of the invention in which:

FIG. 12A to FIG. 12C are cross-sectional views of energy storage devices according to modifications of the embodiment respectively having partition members different from the partition member of the energy storage device according to the embodiment.

DESCRIPTION OF EMBODIMENTS

Figure 1:
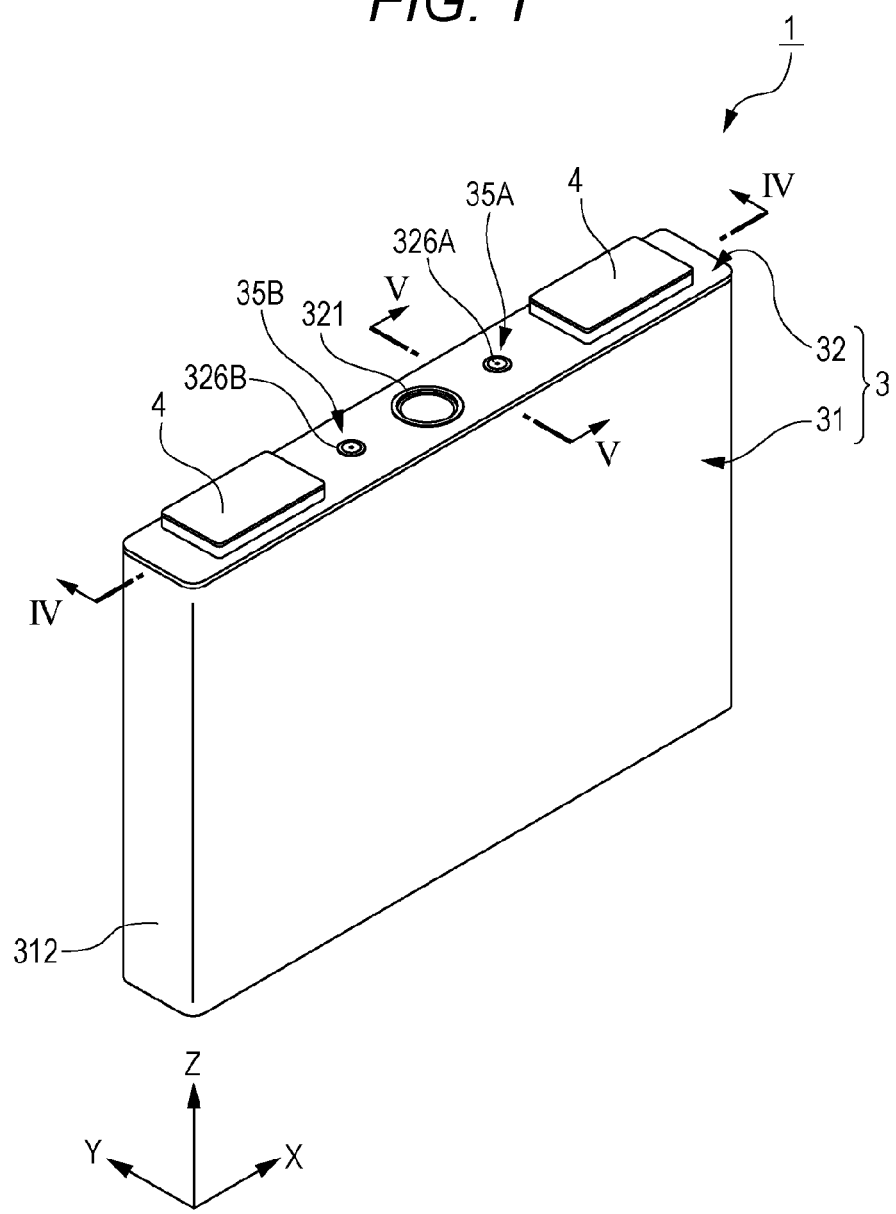
FIG. 1 is a perspective view of an energy storage device according to one embodiment of the present invention.
Figure 2:
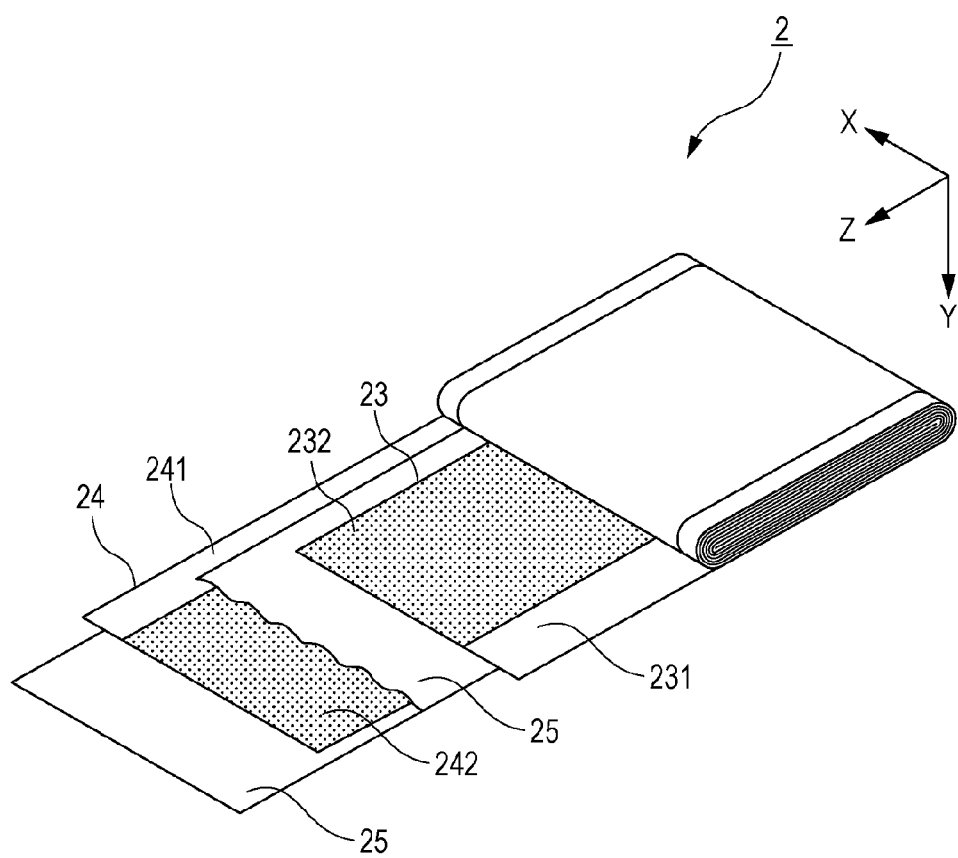
FIG. 2 is a view describing the configuration of an electrode assembly of the energy storage device according to the embodiment.

According to an aspect of the present invention, there is provided an energy storage device including: an electrode assembly formed by winding electrodes and a separator in a layered state; a case for storing the electrode assembly therein, the case having an electrolyte solution sealing portion where an electrolyte solution pouring hole formed in the case is sealed; and at least one partition member arranged in a gap formed between the case and the electrode assembly stored in the case, wherein the partition member partitions the gap in the winding axis direction of the electrode assembly by surrounding the electrode assembly in the winding direction of the electrode, and the electrolyte solution pouring hole is arranged at a position closer to one end of the electrode assembly than the partition member is in the winding axis direction.

With this configuration, the gap formed between the case and the electrode assembly is partitioned by the partition member and hence, an electrolyte solution poured in the case cannot move into a space in the case where the other end of the electrode assembly is positioned through the gap. Accordingly, the electrolyte solution impregnates (infiltrates) into the electrode assembly from one end of the electrode assembly and hence, it is possible to prevent the impregnation of the electrolyte solution into the electrode assembly from becoming non-uniform. That is, the electrolyte solution poured in the case impregnates into the electrode assembly toward the other end from one end of the electrode assembly and hence, a gas present between the electrode and the separator before the pouring of the electrolyte solution is discharged from the other end of the electrode assembly such that the gas is pushed out by the impregnated electrolyte solution whereby the gas minimally remains in the inside of the electrode assembly when the electrolyte solution impregnates into the whole electrode assembly. As a result, it is possible to acquire an energy storage device where the impregnation of an electrolyte solution into the inside of an electrode assembly minimally becomes non-uniform.

In the energy storage device, the case may include a gas discharge sealing portion where a vent hole formed in the case is sealed, and the vent hole may be formed at a position closer to the other end of the electrode assembly than the partition member is in the winding axis direction.

With this configuration, a gas in a space in the case positioned closer to the other end side (an end portion of the case corresponding to the other end of the electrode assembly) than the partition member is can be discharged to the outside of the case through the vent hole and hence, it is possible to prevent a pressure in the space on the other end side from becoming higher than a pressure in a space in the case which is partitioned from the space on the other end side by the partition member (the space in the case positioned closer to one end side (an end portion of the case corresponding to the other end of the electrode assembly) than the partition member is). Accordingly, at the time of manufacturing the energy storage device, it is possible to prevent the occurrence of a state where an electrolyte solution poured in the space on the one end side minimally impregnates into the inside of the electrode assembly due to the pressure difference between the space on one end side and the space on the other end side.

In the energy storage device, it is preferable that the partition member be non-porous.

With this configuration, a fluid (a gas and an electrolyte solution in the case) cannot permeate the partition member and hence, the gap formed between the case and the electrode assembly is effectively partitioned by the partition member.

In the energy storage device, the partition member arranged close to one end of the case may be arranged on the electrode assembly at a position closer to one end of the electrode assembly than a center position of the electrode assembly is in the winding axis direction.

With this configuration, at the time of pouring an electrolyte solution, a space in the case where the electrolyte solution can move in the gap becomes small compared to the case where the partition member is arranged at the center position of the electrode assembly and hence, one end (one end in the winding axis direction) of the electrode assembly and the poured electrolyte solution are more easily brought into contact with each other whereby the electrolyte solution impregnates into the electrode assembly more efficiently.

In the energy storage device, the electrode assembly may include a winding core which has a hollow portion, and has a peripheral surface around which the electrodes and the separator are wound, and the winding core may have a partition portion which partitions the hollow portion in the winding axis direction.

With this configuration, even when the winding core having the hollow portion is used in the electrode assembly, it is possible to prevent an electrolyte solution from moving from a space (region) where one end of the electrode assembly is positioned to a space (region) where the other end of the electrode assembly is positioned through the hollow portion of the winding core in the case at the time of pouring the electrolyte solution. Accordingly, it is possible to make an electrolyte solution impregnate into the electrode assembly from one end of the electrode assembly with more certainty.

According to another aspect of the present invention, there is provided a method of manufacturing an energy storage device which includes an electrode assembly formed by winding electrodes and a separator in a layered state, and a case for storing the electrode assembly therein, the case having an electrolyte solution sealing portion where an electrolyte solution pouring hole formed in the case is sealed, wherein the method includes a step of pouring an electrolyte solution in the case through the electrolyte solution pouring hole which is in a non-sealed state and is formed at a position closer to one end of the electrode assembly than the partition member is in the winding axis direction, the case being in a state where at least one partition member is arranged in a gap formed between the case and the electrode assembly stored in the case, and the partition member partitions the gap in the winding axis direction of the electrode assembly by surrounding the electrode assembly in the winding direction of the electrode.

With this configuration, the gap formed between the case and the electrode assembly is partitioned by the partition member and hence, an electrolyte solution poured in the case cannot move to the other end side of the electrode assembly through the gap. Accordingly, the electrolyte solution impregnates (infiltrates) into the electrode assembly from one end of the electrode assembly and hence, it is possible to prevent the impregnation of the electrolyte solution into the electrode assembly from becoming non-uniform. That is, the electrolyte solution poured in the case impregnates into the electrode assembly toward the other end from one end of the electrode assembly and hence, a gas present between the electrode and the separator before the pouring of the electrolyte solution is discharged from the other end of the electrode assembly such that the gas is pushed out by the impregnated electrolyte solution whereby the gas minimally remains in the inside of the electrode assembly when the electrolyte solution impregnates into the whole electrode assembly. As a result, the impregnation of an electrolyte solution into the inside of an electrode assembly minimally becomes non-uniform.

In the method of manufacturing an energy storage device, the case may include a gas discharge sealing portion where a vent hole formed in the case is sealed, and the vent hole may be formed at a position closer to the other end of the electrode assembly than the partition member is in the winding axis direction, and the pouring of the electrolyte solution may be performed in a state where the vent hole is not sealed.

With this configuration, a gas in a space in the case positioned closer to the other end side (an end portion of the case corresponding to the other end of the electrode assembly) than the partition member is can be discharged to the outside of the case through the vent hole and hence, it is possible to prevent a pressure in the space on the other end side from becoming higher than a pressure in a space in the case which is positioned closer to one end side (an end portion of the case corresponding to the other end of the electrode assembly) than the partition member is. Accordingly, at the time of pouring an electrolyte solution in the case, it is possible to prevent the occurrence of a state where an electrolyte solution poured in the space on the one end side minimally impregnates into the inside of the electrode assembly due to the pressure difference between the space on one end side and the space on the other end side.

In this case, the method may include a step of discharging a gas through the vent hole, and the pouring of the electrolyte solution may be performed along with the discharging of the gas or after the discharging of the gas.

With this configuration, by discharging a gas through the vent hole, a pressure in the space positioned at the other end of the electrode assembly can be made smaller than a pressure in the space positioned at one end of the electrode assembly at the time of pouring an electrolyte solution and hence, it is possible to make the electrolyte solution more efficiently impregnate into the inside of the electrode assembly (the whole electrode assembly) toward the other end from one end of the electrode assembly. That is, the pressure difference is generated between the space where one end of the electrode assembly is positioned and the space where the other end of the electrode assembly is positioned, and the electrolyte solution can be more efficiently made to impregnate into the inside of the electrode assembly toward the other end from one end of the electrode assembly by making use of the pressure difference.

In the method of manufacturing an energy storage device, it is preferable that, in the pouring of an electrolyte solution, the electrolyte solution be poured in the case with the case held in a posture where the electrolyte solution pouring hole is positioned below the vent hole.

With this configuration, an electrolyte solution is poured in the case held in the posture where the space in the case in which the electrolyte solution is poured (a space where one end of the electrode assembly is positioned) is positioned below the space in the case partitioned from the space by the partition member (the space where the other end of the electrode assembly is positioned) and hence, the poured electrolyte solution is easily collected to an area in the vicinity of one end of the electrode assembly due to gravity of the electrolyte solution whereby it is possible to make the electrolyte solution efficiently impregnate into the electrode assembly.

In this case, it is preferable that, in the pouring of an electrolyte solution, the electrolyte solution be poured in the case with the case held in a posture where the winding axis direction of the electrode assembly stored in the inside of the case is directed vertically.

With this configuration, an electrolyte solution is poured in the case in the posture where the space in which the electrolyte solution is poured forms a lower end in the case and one end of the electrode assembly positioned in the space is directed downward and hence, the whole end portion of the electrode assembly on one end side is easily brought into contact with the electrolyte solution whereby it is possible to make the electrolyte solution more efficiently impregnate into the electrode assembly.

The method of manufacturing an energy storage device may include a step of bringing the inside of the case into a state where a pressure is lower than an atmospheric pressure, and the pouring of the electrolyte solution may be performed after bringing the inside of the case into a low pressure state.

With this configuration, an electrolyte solution is sucked into the case during the pouring of the electrolyte solution and hence, the electrolyte solution can be easily poured in the inside of the case. Further, a volume of a space in the case in which an electrolyte solution is poured (a space where one end of the electrode assembly is positioned: first space) becomes small by an amount of a volume of the poured electrolyte solution and hence, a pressure difference is generated between such a space and a space in the case partitioned by the partition member (a space where the other end of the electrode assembly is positioned: second space), that is, a pressure in the second space becomes relatively smaller than a pressure in the first space whereby the electrolyte solution which impregnates into the electrode assembly from one end of the electrode assembly due to the pressure difference is pulled toward the other end of the electrode assembly. Accordingly, it is possible to make an electrolyte solution efficiently impregnate into the inside of the electrode assembly.

In this case, it is preferable that the inside of the case be brought into the low pressure state by discharging a gas through the electrolyte solution pouring hole, and portions of the case except for the electrolyte solution pouring hole have the airtight structure.

With this configuration, it is no more necessary to provide the vent hole for bringing the inside of the case into the low pressure state by discharging a gas and a vent plug for sealing the vent hole after discharging a gas and hence, the number of parts can be decreased and, at the same time, an operation of sealing the vent hole by welding the vent plug to the case after discharging a gas in manufacturing steps can be omitted.

In the method of manufacturing the energy storage device, it is preferable that the partition member be non-porous.

With this configuration, a fluid (a gas and an electrolyte solution in the case) cannot permeate the partition member and hence, the gap formed between the case and the electrode assembly can be more effectively partitioned by the partition member.

As described above, according to the aspects of the present invention, it is possible to provide the energy storage device where the impregnation of an electrolyte solution to the inside of the electrode assembly minimally becomes non-uniform, and a method of manufacturing an energy storage device.

Hereinafter, one embodiment of an energy storage device according to the present invention is described by reference to FIG. 1 to FIG. 8. The energy storage device may be a primary battery, a secondary battery, a capacitor or the like. In this embodiment, as one example of the energy storage device, a chargeable/dischargeable secondary battery is described. Names of respective members (respective components) used in this embodiment are exclusively for this embodiment, and may differ from names of respective members (respective components) used in the BACKGROUND section.

The energy storage device of this embodiment is a non-aqueous electrolyte secondary battery. To be more specific, the energy storage device is a lithium ion secondary battery which makes use of the electron movement generated due to the movement of lithium ions. The energy storage device of this type supplies electrical energy. The number of energy storage devices used is one or more. More specifically, when a required output and a required voltage are small, the number of energy storage devices used is one. On the other hand, when at least one of either a required output or a required voltage is large, the energy storage device is used as an energy storage apparatus in combination with other energy storage devices. In the energy storage apparatus, the energy storage device or energy storage devices used in the energy storage apparatus supply electrical energy.

As shown in FIG. 1 to FIG. 5, the energy storage device includes: an electrode assembly 2 formed by winding electrodes and a separator 25 in a layered state; a case 3 for storing the electrode assembly 2 therein; a partition member 8 which partitions a gap formed between the case 3 and the electrode assembly 2 stored in the case 3; and external terminals 4 which are arranged outside the case 3, and are conductive with the electrode assembly 2. The energy storage device 1 also includes current collectors 5 and the like which make the electrode assembly 2 and the external terminals 4 conductive with each other in addition to the electrode assembly 2, the case 3 and the external terminals 4. The energy storage device is specifically described hereinafter.

The electrode assembly includes: a strip-like electrode (positive electrode) 23 having positive polarity; and a strip-like electrode (negative electrode) 24 having negative polarity. The electrode assembly 2 is formed by winding the positive electrode 23 and the negative electrode 24 in a state where the positive electrode 23 and the negative electrode 24 are insulated from each other.

The positive electrode 23 includes a metal foil and a positive active material layer formed on the metal foil. The metal foil has a strip shape. The metal foil in this embodiment is an aluminum foil, for example. The positive electrode 23 has a non-coated portion 231 which is not coated by the positive active material layer (a portion on which the positive active material layer is not formed) at one edge portion thereof in the width direction which is a short-length direction of the strip shape. The portion of the positive electrode 23 on which the positive active material layer is formed is referred to as a coated portion 232.

The negative electrode 24 includes a metal foil and a negative active material layer formed on the metal foil. The metal foil has a strip shape. The metal foil in this embodiment is a copper foil, for example. The negative electrode 24 has a non-coated portion 241 which is not coated by the negative active material layer (a portion on which the negative active material layer is not formed) at the other edge portion thereof (on a side opposite to the non-coated portion 231 of the positive electrode 23) in the width direction which is a short-length direction of the strip shape. The portion of the negative electrode 24 on which the negative active material layer is formed is referred to as a coated portion 242.

In the electrode assembly 2 of this embodiment, the positive electrode 23 and the negative electrode 24 having the above-mentioned configuration are wound in a state where the positive electrode 23 and the negative electrode 24 are insulated from each other by the separator 25. The separator 25 is a strip-like member having insulating property. The separator 25 is arranged between the positive electrode 23 and the negative electrode 24. Due to such arrangement of the separator 25, the positive electrode 23 and the negative electrode 24 are insulated from each other in the electrode assembly 2. The separator 25 retains an electrolyte solution in the inside of the case 3. Accordingly, at the time of charging or discharging the energy storage device 1, lithium ions are movable between the positive electrode 23 and the negative electrode 24 which are alternately layered with the separator 25 interposed therebetween.

Figure 3:
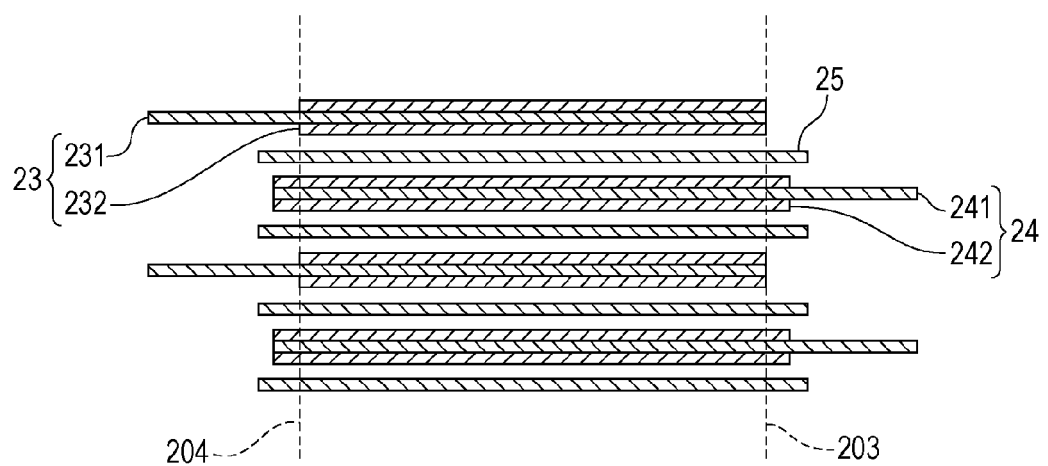
FIG. 3 is a view describing a layered state of a positive electrode, a negative electrode, and a separator.

As shown in FIG. 3, the separator 25 is arranged between the positive electrode 23 and the negative electrode 24 which overlap with each other in a displaced manner in the width direction such that the coated portion 232 and the coated portion 242 overlap with each other. Here, the non-coated portion 231 of the positive electrode 23 and the non-coated portion 241 of the negative electrode 24 do not overlap with each other. That is, the non-coated portion 231 of the positive electrode 23 projects in the width direction from a region where the positive electrode 23 and the negative electrode 24 overlap with each other, and the non-coated portion 241 of the negative electrode 24 projects in the width direction (the direction opposite to the direction where the non-coated portion 231 of the positive electrode 23 projects) from the region where the positive electrode 23 and the negative electrode 24 overlap with each other. The electrode assembly 2 is formed by winding a layered product 22 formed of the positive electrode 23, the negative electrode 24, and the separator 25 in the above-mentioned layered state. In FIG. 3, to facilitate the description of the relative position between the positive electrode 23, the negative electrode 24, and the separator 25, thicknesses of the respective elements are described in an exaggerated manner.

The case 3 includes: a case body 31 having an opening; and a lid plate 32 which closes (seals) the opening of the case body 31. The case 3 has an electrolyte solution sealing portion 35A where an electrolyte solution pouring hole 325A formed in the case 3 is sealed. The case 3 also has a gas discharge sealing portion 35B where a vent hole 325B formed in the case 3 is sealed. The case 3 stores an electrolyte solution in an inner space 33 together with the electrode assembly 2, the current collectors 5, and the like. The case 3 is made of metal having resistance against an electrolyte solution. The electrolyte solution is a nonaqueous electrolyte solution. The electrolyte solution can be obtained by dissolving an electrolyte salt in an organic solvent.

The case 3 has a rectangular parallelepiped shape. That is, the energy storage device 1 of this embodiment is a so-called prismatic battery. The case 3 is formed by joining an opening peripheral portion of the case body 31 and a peripheral portion of the lid plate 32 in a state where the opening peripheral portion of the case body 31 and the peripheral portion of the lid plate 32 overlap with each other. The case 3 has the inner space 33 defined by the case body 31 and the lid plate 32.

The case body 31 includes: a plate-shaped closed portion 311; and a cylindrical barrel portion 312 connected to a peripheral edge of the closed portion 311.

The closed portion 311 is a portion which is positioned at a lower end of the case body 31 when the case body 31 is arranged with the opening directed upward (that is, a portion which forms a bottom wall of the case body 31 when the case body 31 is arranged with the opening directed upward). The closed portion 311 has a rectangular shape as viewed in the normal direction of the closed portion 311. Hereinafter, as shown in FIG. 1, assume the long axis direction of the closed portion 311 as the X axis direction, the short axis direction of the closed portion 311 as the Y axis direction, and the normal direction of the closed portion 311 as the Z axis direction.

The barrel portion 312 in this embodiment has an angular cylindrical shape. To be more specific, the barrel portion 312 has a flattened angular cylindrical shape.

As described above, the case body 31 has an angular cylindrical shape with one end portion in the opening direction (Z axis direction) thereof closed (that is, a bottomed angular cylindrical shape).

The lid plate 32 is a plate-shaped member which closes the opening of the case body 31. To be more specific, the peripheral portion of the lid plate 32 is made to overlap with the opening peripheral portion of the case body 31 such that the lid plate 32 closes the opening of the case body 31. In a state where the opening peripheral portion and the lid plate 32 are made to overlap with each other, a boundary portion between the lid plate 32 and the case body 31 is welded to each other thus forming the case 3.

The lid plate 32 has a profile shape corresponding to the opening peripheral portion of the case body 31 as viewed in the Z axis direction. That is, the lid plate 32 is formed of a plate member having an elongated rectangular shape extending in the X axis direction as viewed in the Z axis direction.

The lid plate 32 has a gas release vent 321 which can discharge a gas in the case 3 to the outside. The gas release vent 321 discharges a gas to the outside from the inside of the case 3 when an internal pressure in the case 3 is elevated to a predetermined pressure. The gas release vent 321 in this embodiment is formed at a center portion of the lid plate 32 in the X axis direction.

To be more specific, the gas release vent 321 has a thin wall portion on which a breaking groove is formed. In the gas release vent 321, when an internal pressure (gas pressure) in the case 3 becomes larger than a predetermined value, the thin wall portion is torn starting from the breaking groove so that the inside of the case 3 (inner space 33) and the outside (outer space) communicate with each other. Accordingly, the gas release vent 321 discharges a gas in the case 3 to the outside. In this manner, the gas release vent 321 lowers the elevated internal pressure in the case 3.

A pair of through holes 322 which makes the inside and the outside of the case 3 communicate with each other is formed in the lid plate 32. The through hole 322 is formed in both end portions of the lid plate 32 in the X axis direction respectively (see FIG. 4). Penetration members 7 described later are made to pass through the through holes 322 respectively.

An electrolyte solution pouring hole 325A for pouring an electrolyte solution into the case 3 is formed in the case 3. The electrolyte solution pouring hole 325A makes the inside and the outside of the case 3 communicate with each other. In this embodiment, the electrolyte solution pouring hole 325A is formed in the lid plate 32. The electrolyte solution pouring hole 325A penetrates through the lid plate 32 in the Z axis direction (thickness direction). The electrolyte solution pouring hole 325A is disposed between the gas release vent 321 and either one of the pair of through holes 322 (right through hole 322 in FIG. 4) in the X axis direction.

The electrolyte solution pouring hole 325A having the above-mentioned configuration is hermetically closed (sealed) by an electrolyte solution pouring plug 326A thus forming an electrolyte solution sealing portion 35A on the case 3. That is, the electrolyte solution sealing portion 35A includes: the electrolyte solution pouring hole 325A; and the electrolyte solution pouring plug 326A. In this embodiment, the electrolyte solution pouring plug 326A is fixed to the case 3 (the lid plate 32 in this embodiment) by welding. To be more specific, the electrolyte solution pouring plug 326A includes: a head portion which covers the electrolyte solution pouring hole 325A; and an insertion portion which extends from the head portion.

The head portion is a portion which covers the electrolyte solution pouring hole 325A. The head portion is a plate-shaped portion, and covers the electrolyte solution pouring hole 325A in a state where the head portion overlaps with the lid plate 32. In this embodiment, the head portion has an approximately circular profile as viewed in the Z axis direction.

The insertion portion extending from the head portion passes through the electrolyte solution pouring hole 325A and extends toward the inside of the case 3. That is, the insertion portion is a columnar-shaped portion which extends from the head portion. A size of the insertion portion is slightly larger than a size of the electrolyte solution pouring hole 325A formed in the lid plate 32. Accordingly, when the electrolyte solution pouring plug 326A is mounted in the lid plate 32, the insertion portion is press-fitted in the electrolyte solution pouring hole 325A.

The vent hole 325B through which a fluid (air, gas or the like) in the case 3 can be discharged is also formed in the case 3. The vent hole 325B has substantially the same configuration as the electrolyte solution pouring hole 325A. That is, the vent hole 325B makes the inside and the outside of the case 3 communicate with each other. In this embodiment, the vent hole 325B is formed in the lid plate 32. The vent hole 325B penetrates the lid plate 32 in the Z axis direction. The vent hole 325B is disposed between the gas release vent 321 and either the other of the pair of through holes 322 (left through hole 322 in FIG. 4) in the X axis direction.

The vent hole 325B having the above-mentioned configuration is hermetically closed (sealed) by the vent plug 326B thus forming the gas discharge sealing portion 35B of the case 3. That is, the gas discharge sealing portion 35B has the vent hole 325B and the vent plug 326B. In this embodiment, the vent plug 326B is fixed to the case 3 (the lid plate 32 in this embodiment) by welding. The vent plug 326B has substantially the same configuration as the electrolyte solution pouring plug 326A. That is, the vent plug 326B includes: a plate-shaped head portion which covers the vent hole 325B; and a columnar-shaped insertion portion which extends from the head portion and is press-fitted in the vent hole 325B.

Figure 4:
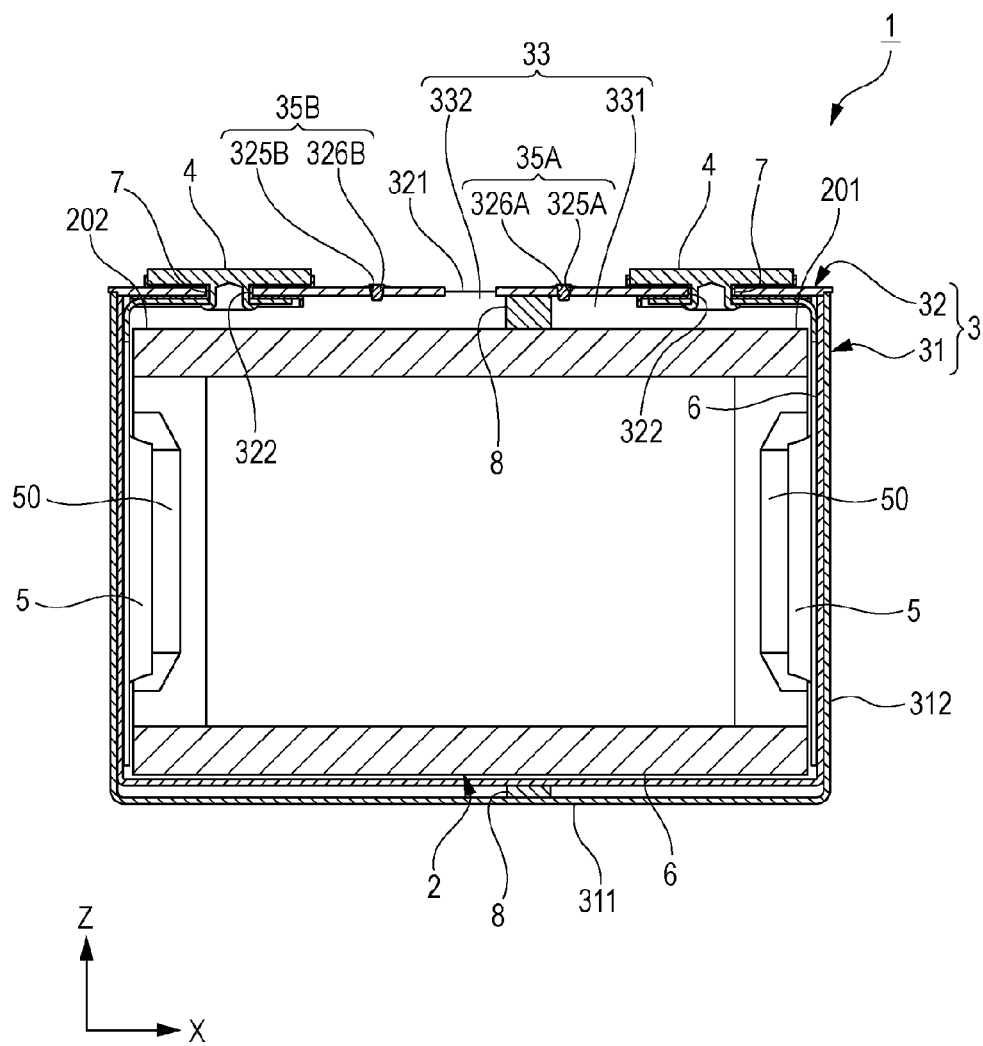
FIG. 4 is a cross-sectional view taken along a line IV-IV in FIG. 1.
Figure 5:
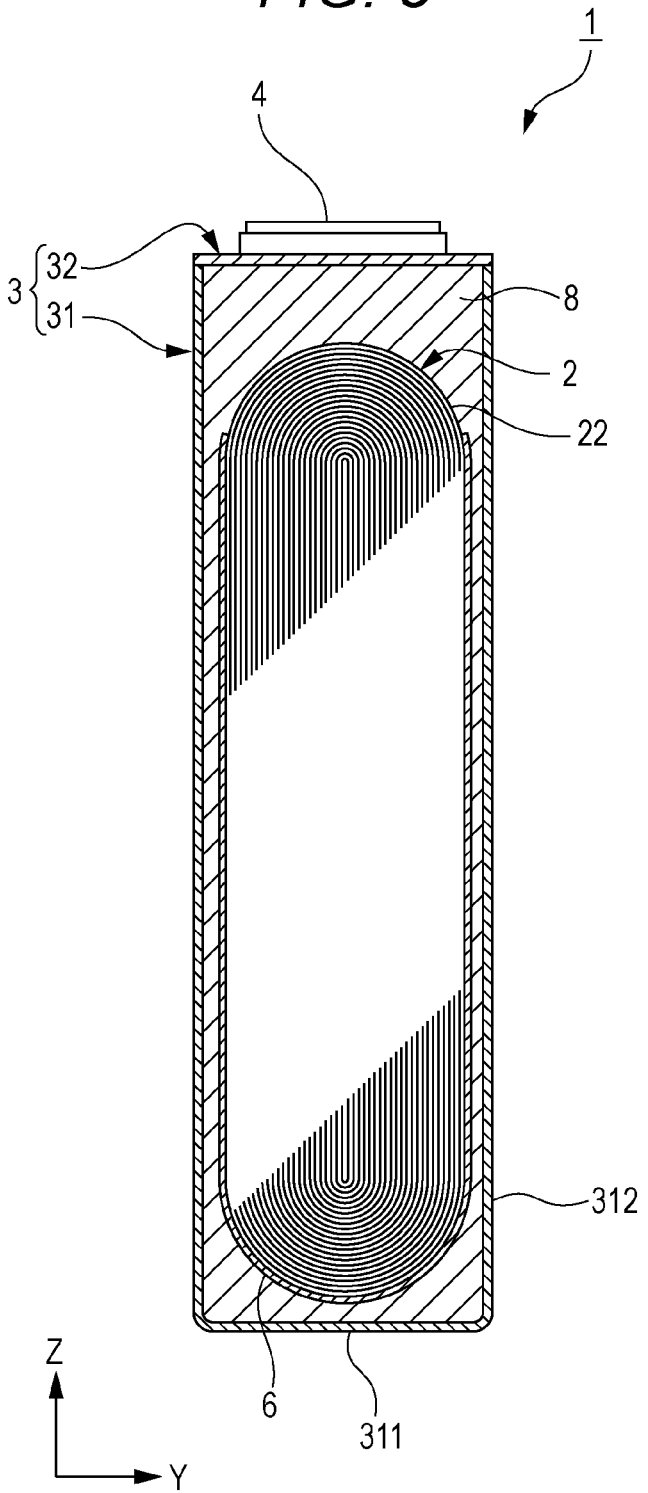
FIG. 5 is a cross-sectional view taken along a line V-V in FIG. 1.
Figure 6:
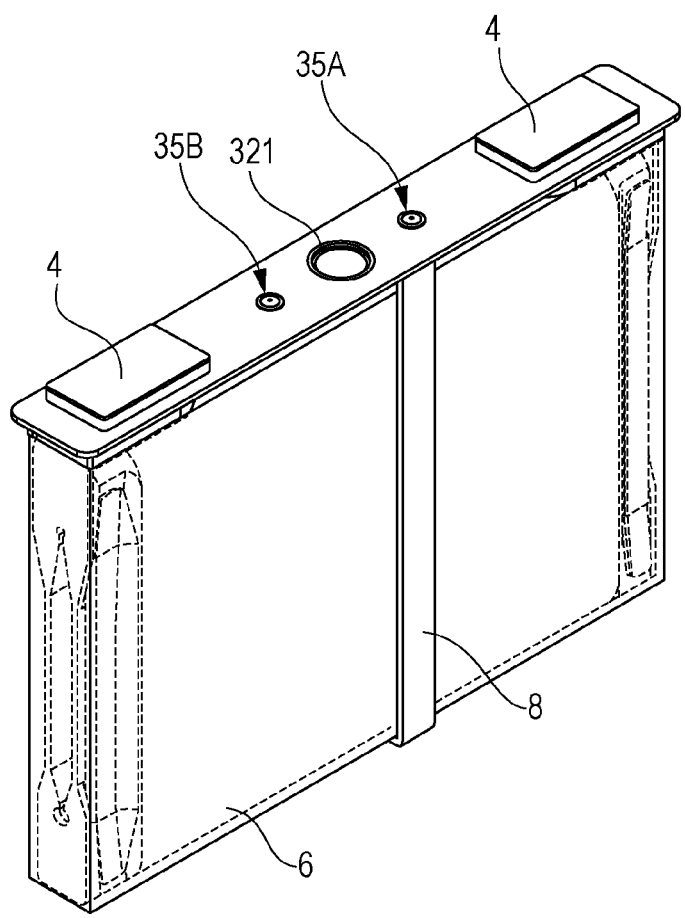
FIG. 6 is a perspective view showing the energy storage device according to the embodiment in a partially assembled state, and is also a perspective view showing the energy storage device in a state where an electrolyte solution pouring plug, an electrode assembly, current collectors, a partition member and external terminals are assembled to a lid plate.

As shown in FIG. 4 to FIG. 6, the partition member 8 partitions a gap formed between the case 3 and the electrode assembly 2 in the X axis direction (the winding axis direction of the electrode assembly 2) by surrounding the electrode assembly 2 in the winding direction of the electrodes (the positive electrode 23 and the negative electrode 24). The partition member 8 has an annular shape. To be more specific, as viewed in the X axis direction, the partition member 8 has an annular shape where a profile of an outer peripheral surface of the partition member 8 has a shape corresponding to an inner peripheral surface of the case 3 (rectangular shape), and a profile of an inner peripheral surface of the partition member 8 has an annular shape corresponding to an outer peripheral surface of the electrode assembly 2. In the energy storage device 1 of this embodiment, one partition member 8 partitions the inner space 33 of the case 3 into two spaces (regions). To be more specific, the inner space 33 of the case 3 is partitioned into two spaces by partitioning a space formed between the outer peripheral surface of the electrode assembly 2 and an inner surface of the case 3 (an inner surface of the case body 31 and an inner surface of the lid plate 32). As shown in FIG. 6, the partition member 8 in this embodiment surrounds the electrode assembly 2 which is in a state of being stored in the insulation cover 6 as described later from the outside of the insulation cover 6 in the winding direction. Here, the inner peripheral surface of the partition member 8 and the outer peripheral surface of the electrode assembly 2 are brought into contact with each other by way of the insulation cover 6, and the outer peripheral surface of the partition member 8 and the inner peripheral surface of the case 3 are brought into contact with each other or face each other with an extremely slight gap formed therebetween. With this configuration, in the inside of the case 3, the partition member 8 partitions a space formed between the outer surface of the electrode assembly 2 (to be more specific, the insulation cover 6 in a state of storing the electrode assembly 2 therein) and the inner surface of the case 3. In this embodiment, the insulation cover 6 does not cover the whole electrode assembly 2. To be more specific, the insulation cover 6 covers the electrode assembly 2 such that an edge portion of the electrode assembly 2 on an external terminal 4 side is exposed to the outside. Accordingly, the partition member 8 is directly brought into contact with the edge portion of the electrode assembly 2 on the external terminal 4 side.

Hereinafter, a space formed in the inside of the case 3 where one end (a right end portion in FIG. 4) 201 of the electrode assembly 2 in the X axis direction is positioned is referred to as a first space 331, and a space formed in the inside of the case 3 where the other end (a left end portion in FIG. 4) 202 of the electrode assembly 2 in the X axis direction is positioned is referred to as a second space 332. Further, an end portion of the case 3 corresponding to one end 201 of the electrode assembly 2 is referred to as one end of the case 3, and an end portion of the case 3 corresponding to the other end 202 of the electrode assembly 2 is referred to as the other end of the case 3.

The partition member 8 is made of a material having elasticity and resistance against an electrolyte solution, such as elastomer, rubber or melamine sponge, for example. The partition member 8 is preferably made of silicone rubber, fluoro-rubber, styrene rubber, ethylene-propylene rubber, butyl rubber, perfluoro-elastomer or the like. In this embodiment, the partition member 8 is non-porous. The partition member 8 is arranged at a position closer to one end 201 of the electrode assembly 2 than a center position of the electrode assembly 2 is in the X axis direction. In this embodiment, the partition member 8 is arranged between the gas release vent 321 and the electrolyte solution pouring hole 325A in the X axis direction. Accordingly, the electrolyte solution pouring hole 325A (electrolyte solution sealing portion 35A) is arranged at a position closer to one end of the case 3 than the partition member 8 is in the X axis direction. The vent hole 325B (gas discharge sealing portion 35B) is arranged at a position closer to the other end of the case 3 than the partition member 8 is in the X axis direction. That is, the electrolyte solution pouring hole 325A is arranged at a position which faces the first space 331 in the case 3 where the one end 201 of the electrode assembly 2 is positioned, and the vent hole 325B is arranged at a position which faces the second space 332 in the case 3 where the other end 202 of the electrode assembly 2 is positioned.

An external size (size) of the partition member 8 in the Y axis direction is preferably set to 95% to 105% of an internal size of the case 3 in the Y axis direction. To be more specific, it is preferable that, in both a case where the energy storage device 1 is in a discharged state and a case where the energy storage device 1 is in a charged state, the external size of the partition member 8 in the Y axis direction falls within the above-mentioned range (95% to 105%). The external size of the partition member 8 in this embodiment in the Y axis direction is 97% of the internal size of the case 3 in the Y axis direction in a state where energy is not yet charged into the energy storage device 1, for example.

By setting the external size of the partition member 8 to a value which falls within the above-mentioned range (95% to 105%), it is possible to prevent the case 3 from being damaged due to the expansion and contraction of the electrode assembly 2 caused by charging and discharging of the energy storage device 1. Further, at the time of manufacturing the energy storage device 1 (to be more specific, at the time of pouring an electrolyte solution), the partition member 8 can effectively suppress the movement of an electrolyte solution from the first space 331 to the second space 332 in the gap formed between the case 3 and the electrode assembly 2.

The external terminal 4 is a portion which is electrically connected to an external terminal of another energy storage device, external equipment or the like. The external terminal 4 is made of a material having conductivity. For example, the external terminal 4 is made of a metal material having high weldability such as an aluminum-based metal material such as aluminum or an aluminum alloy, or a copper-based metal material such as copper or a copper alloy.

The energy storage device 1 includes penetration members 7 which penetrate the case 3. The penetration member 7 makes the current collector 5 arranged in the inside of the case 3 and the external terminal 4 arranged outside the case 3 electrically conductive with each other. The penetration member 7 is made of conductive metal, and extends from the external terminal 4 to the current collector 5. In this embodiment, the penetration member 7 is integrally formed with the external terminal 4. Hermetic sealing is applied to the lid plate 32 with the external terminal 4 and the penetration member 7. That is, the case 3 has the airtight structure except for the electrolyte solution pouring hole 325A and the vent hole 325B.

The current collectors 5 are arranged in the inside of the case 3, and are directly or indirectly electrically connected with the electrode assembly 2. The current collectors 5 in this embodiment are electrically connected with the electrode assembly 2 by way of clip members 50. The current collector 5 is made of a material having conductivity. As shown in FIG. 4, the current collectors 5 are arranged along the inner surface of the case 3. In this embodiment, the current collector 5 makes the penetration member 7 and the clip member 50 electrically connected with each other. Each of the current collectors 5 is arranged on a positive electrode and a negative electrode of the energy storage device 1. In the energy storage device 1 of this embodiment, each of the current collectors 5 is connected to one end 201 and the other end 202 of the electrode assembly 2 in the inside of the case 3.

The energy storage device 1 includes an insulating member 6 which insulates the electrode assembly 2 and the case 3 from each other. In this embodiment, the insulating member 6 is an insulation cover, for example. As shown in FIG. 4 and FIG. 5, the insulation cover 6 is arranged between the case 3 (to be more specific, the case body 31) and the electrode assembly 2. The insulation cover 6 is made of a material having insulation property. The insulation cover 6 is formed of a sheet-like member. In this embodiment, the insulation cover 6 is made of a resin such as polypropylene or polyphenylene sulfide. The insulation cover 6 is formed into a bag shape by bending a sheet-like member which has insulation property and has a predetermined shape by cutting. In this embodiment, the insulation cover 6 covers side surfaces of the electrode assembly 2 (planar regions of a peripheral surface of the electrode assembly 2 which face the barrel portion 312 of the case body 31) and a bottom surface of the electrode assembly 2 (a curved region of the peripheral surface of the electrode assembly 2 which faces the closed portion 311 of the case body 31).

Instead of forming the insulation cover 6 into a bag shape by simply bending a sheet-like member, the insulation cover 6 may be formed into a bag shape by fusing or welding a sheet-like member, for example. The insulation cover 6 may be formed into a bag shape from the beginning. The electrode assembly 2 and the case 3 may be insulated from each other by forming an insulation layer on an inner surface of the case 3 instead of using the insulation cover 6.

In the energy storage device 1 of this embodiment, the partition member 8 surrounds the electrode assembly 2 in a state where the electrode assembly 2 is stored in the bag-shaped insulation cover 6 from the outside of the insulation cover 6, and the electrode assembly 2 in such a state is stored in the case 3. With this configuration, in the inside of the case 3, the space (gap) formed between the case 3 and the electrode assembly 2 is partitioned (divided) by the partition member 8 in the X axis direction. As a result, the space 33 formed in the case 3 is divided into two spaces (regions) arranged parallel to each other in the X axis direction, that is, into the first space 331 and the second space 332.

Figure 7:
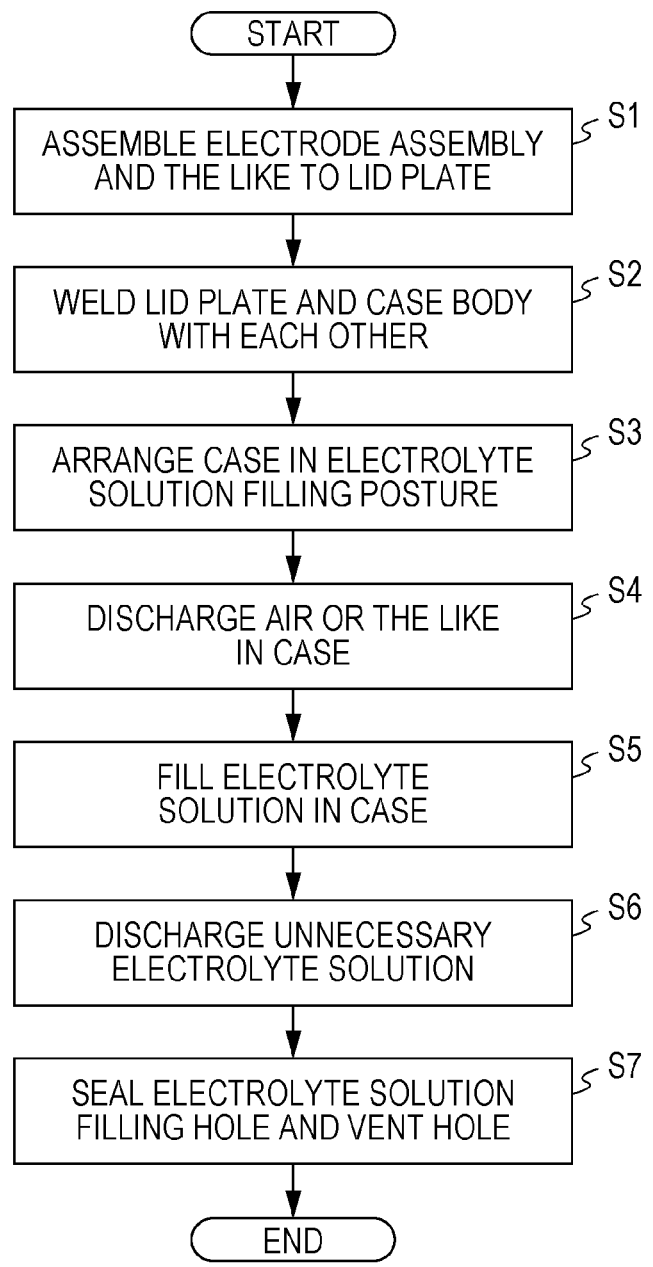
FIG. 7 is a flowchart describing a method of manufacturing the energy storage device according to the embodiment.
Figure 8:
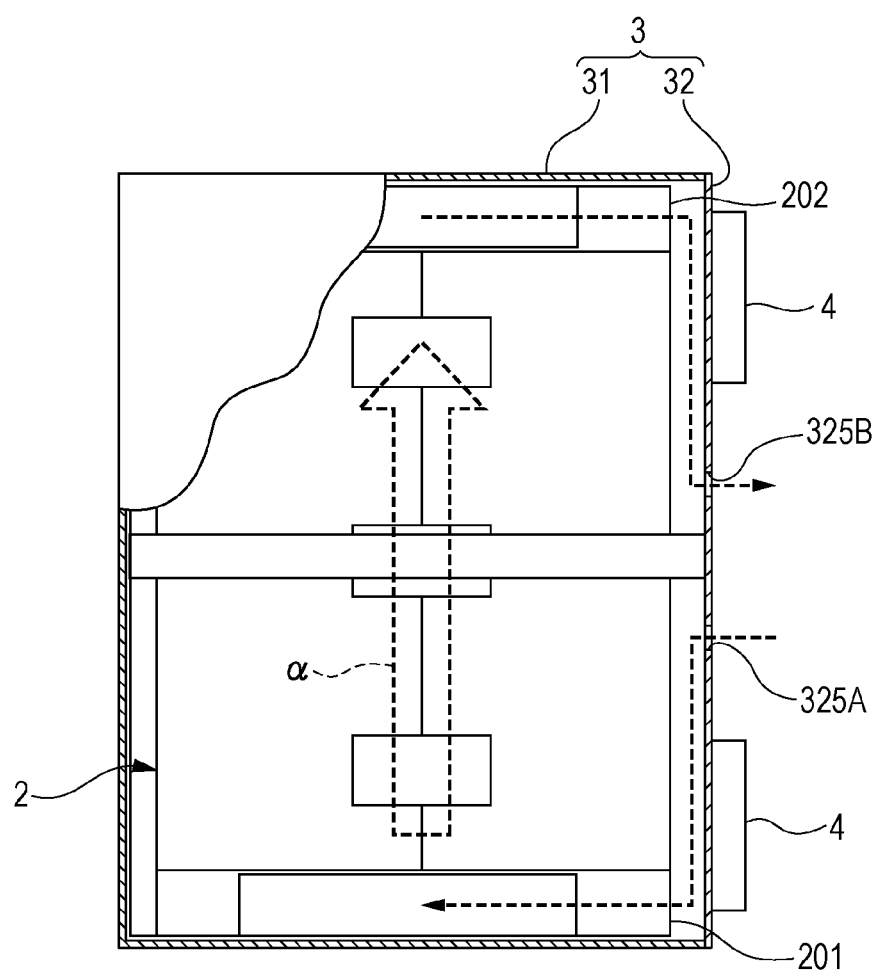
FIG. 8 is a partial cross-sectional view describing a posture of a case at the time of pouring an electrolyte solution, and the direction along which the electrolyte solution moves in the case.

Next, the method of manufacturing the energy storage device 1 having the above-mentioned configuration is described also by reference to FIG. 7 and FIG. 8.

The external terminals 4, the current collectors 5, the electrode assembly 2, the insulation cover 6, the partition member 8 and the like are assembled to the lid plate 32 (step S1). At this stage of the operation, the lid plate 32 is in a state where the electrolyte solution pouring plug 326A is not mounted in the electrolyte solution pouring hole 325A, and the vent plug 326B is not mounted in the vent hole 325B. That is, the electrolyte solution pouring hole 325A is not sealed in the electrolyte solution sealing portion 35A of the case 3, and the vent hole 325B is not sealed in the gas discharge sealing portion 35B of the case 3.

The assembled electrode assembly 2 and the like are stored in the case body 31, and the peripheral portion of the lid plate 32 is made to overlap with the opening peripheral portion of the case body 31 such that the lid plate 32 closes the opening of the case body 31. In such a state, a boundary portion between the lid plate 32 and the case body 31 is welded (step S2).

Next, the case 3 is brought into a posture where the electrolyte solution pouring hole 325A is positioned below the vent hole 325B, and an electrolyte solution is poured in the case 3 through the electrolyte solution pouring hole 325A. To be more specific, an electrolyte solution is poured in the case 3 as follows.

Firstly, as shown in FIG. 8, the case 3 is brought into a posture (electrolyte solution pouring posture) where the electrolyte solution pouring hole 325A is positioned below the vent hole 325B and the winding axis direction (X axis direction) of the electrode assembly 2 is directed in the vertical direction (the direction of gravity) (step S3). Subsequently, in a state where air or the like does not flow into the inside of the case 3 through the electrolyte solution pouring hole 325A, a gas (air or the like) in the inside of the case is discharged through the vent hole 325B such that the inside of the case 3 (to be more specific, at least the second space 332 out of the first space 331 and the second space 332) is brought into a low pressure state (step S4). Here, the inside of the case 3 being in a low pressure state means that a pressure in the case 3 is smaller than an atmospheric pressure (1 atmospheric pressure). From a viewpoint that an electrolyte solution is liable to be sucked into the inside of the case 3 at the time of pouring the electrolyte solution, a pressure in the inside of the case 3 is preferably set to an atmospheric pressure of 0.1 or below, and is more preferably set to an atmospheric pressure of 0.01 or below.

When the inside of the case 3 is brought into a low pressure state, an electrolyte solution is poured into the first space 331 through the electrolyte solution pouring hole 325A (step S5). During the pouring of the electrolyte solution, a gas is continuously discharged through the vent hole 325B.

In this manner, a gas is continuously discharged through the vent hole 325B during the pouring of the electrolyte solution and hence, a pressure difference is generated between the first space 331 and the second space 332 which is partitioned from the first space 331 by the partition member 8, and due to such a pressure difference, an electrolyte solution which impregnates into the electrode assembly 2 from one end 201 side of the electrode assembly 2 is pulled toward the other end 202 side of the electrode assembly 2 (see an arrow a in FIG. 8). In such a state, an electrolyte solution poured in the first space 331 impregnates into the inside of the electrode assembly 2 from the one end 201 side of the electrode assembly 2 (to be more specific, an open end 203: see FIG. 3). The open end 203 is a portion of the electrode assembly 2 which constitutes an inlet through which an electrolyte solution infiltrates into spaces formed between the layered electrodes (the positive electrode 23 and the negative electrode 24) and the separator 25. As shown in FIG. 3, in this embodiment, the open end 203 of the electrode assembly 2 on one end 201 side is a portion of the electrode assembly 2 which is positioned at one edge in the width direction of a portion where the positive electrode 23 and the negative electrode 24 overlap (are layered) with each other in the electrode assembly 2 where the positive electrode 23 and the negative electrode 24 are layered to each other with the separator 25 interposed therebetween in a state where the positive electrode 23 and the negative electrode 24 are positionally displaced from each other in the width direction. To be more specific, the open end 203 on one end 201 side is a portion of the electrode assembly 2 positioned on one edge of the coated portion 232 of the positive electrode 23 (an edge on a side opposite to the non-coated portion 231). On the other hand, the open end 204 of the electrode assembly 2 on the other end 202 side is a portion of electrode assembly 2 which is positioned at the other edge in the width direction of the portion where the positive electrode 23 and the negative electrode 24 overlap with each other (an edge on a side opposite to the open end 203 on one end 201). The open end 204 of the electrode assembly 2 on the other end 202 side is a portion which constitutes an outlet through which a gas (air or the like) present between the electrodes (the positive electrode 23 and the negative electrode 24) and the separator 25 is discharged at the time of pouring of the electrolyte solution. To be more specific, the open end 204 on the other end 202 side is a portion of the electrode assembly 2 which is positioned on the other edge of the coated portion 232 of the positive electrode 23 (the edge arranged adjacent to the non-coated portion 231).

When the electrolyte solution is sufficiently impregnated into the electrode assembly 2 after a lapse of a predetermined time from starting the pouring of an electrolyte solution in the case 3, when necessary, an unnecessary electrolyte solution (a part of the poured electrolyte solution) is discharged through at least one of either the electrolyte solution pouring hole 325A or the vent hole 325B (step S6).

When the unnecessary electrolyte solution is discharged, the electrolyte solution pouring hole 325A is sealed by the electrolyte solution pouring plug 326A and, at the same time, the vent hole 325B is sealed by the vent plug 326B (step S7). Through these steps, the energy storage device 1 is completed.

According to the above-mentioned energy storage device 1 and the method of manufacturing the energy storage device 1, a gap formed between the case 3 and the electrode assembly 2 is partitioned by the partition member 8 and hence, an electrolyte solution poured in the case 3 on the one end 201 side of the electrode assembly 2 cannot move to the other end 202 side of the electrode assembly 2 (that is, from the first space 331 to the second space 332) through the gap. Accordingly, the electrolyte solution impregnates into the electrode assembly 2 from one end 201 of the electrode assembly 2 (the open end 203 of the electrode assembly 2 on one end 201 side) and hence, it is possible to prevent the impregnation of the electrolyte solution into the electrode assembly 2 from becoming non-uniform. That is, the electrolyte solution poured in the case 3 impregnates into the electrode assembly 2 (to be more specific, the space formed between the wound electrodes 23, 24 and the separator 25) toward the other end 202 from one end 201 of the electrode assembly 2 and hence, a gas present between the electrodes 23, 24 and the separator 25 before the pouring of the electrolyte solution is discharged from the other end 202 of the electrode assembly 2 (the open end 204 of the electrode assembly 2 on the other end 202 side) such that the gas is pushed out by the impregnated electrolyte solution. With this configuration, the gas minimally remains in the inside of the electrode assembly 2 when the electrolyte solution impregnates into the whole electrode assembly 2. As a result, the impregnation of an electrolyte solution into the inside of the electrode assembly 2 minimally becomes non-uniform.

The energy storage device 1 has the vent hole 325B which is communicated with the second space 332 and hence, a gas (air, gas or the like) in the space in the case 3 on the other end 202 side (second space 332) from the partition member 8 can be discharged to the outside of the case 3 through the vent hole 325B. With this configuration, it is possible to prevent a pressure in the second space 332 on the other end 202 side from becoming higher than a pressure in the first space 331 in the case 3 on one end 201 side from the partition member 8. As a result, when an electrolyte solution is poured in the case 3, it is possible to prevent the occurrence of a state where an electrolyte solution poured in the first space 331 minimally impregnates into the inside of the electrode assembly 2 due to the pressure difference between the first space 331 and the second space 332.

Further, in the method of manufacturing the energy storage device 1 of this embodiment, an electrolyte solution is poured in the case 3 after the inside of the case 3 is brought into a low pressure state and hence, the electrolyte solution is sucked into the inside of the case 3 during the pouring of the electrolyte solution whereby the electrolyte solution can be easily poured in the inside of the case 3. Further, a gas is continuously discharged through the vent hole 325B also during the pouring of the electrolyte solution and hence, a pressure difference is generated between the first space 331 and the second space 332 partitioned from the first space 331 by the partition member 8, that is, a pressure in the second space 332 becomes relatively smaller than a pressure in the first space 331. With this configuration, an electrolyte solution which impregnates into the electrode assembly 2 from one end 201 of the electrode assembly 2 due to such a pressure difference is pulled toward the other end 202 side of the electrode assembly 2. As a result, it is possible to make an electrolyte solution efficiently impregnate into the inside of the electrode assembly 2.

In the method of manufacturing the energy storage device 1 of this embodiment, in the pouring of an electrolyte solution, the electrolyte solution is poured in the case 3 with the case 3 held in a posture where the X axis direction (winding axis direction) of the electrode assembly 2 is directed vertically. In pouring the electrolyte solution, the electrolyte solution is poured in the case 3 in the posture where the first space 331 forms a lower end in the case 3 and one end 201 (opening end 203) of the electrode assembly 2 positioned in the first space 331 is directed downward. Accordingly, the whole one end 201 (opening end 203) of the electrode assembly 2 in the Z axis direction is brought into contact with the electrolyte solution stored in the lower end of the first space 331 and hence, it is possible to make the electrolyte solution more efficiently impregnate into the electrode assembly 2.

The partition member 8 is non-porous and hence, a fluid (a gas and an electrolyte solution in the case 3) cannot permeate the partition member 8 whereby the gap formed between the case 3 and the electrode assembly 2 can be effectively partitioned by the partition member 8 in the X axis direction.

In the energy storage device 1 of this embodiment, the partition member 8 is arranged on the electrode assembly 2 at a position closer to one end 201 side than the center of the electrode assembly 2 is in the X axis direction. Accordingly, at the time of pouring an electrolyte solution in manufacturing the energy storage device 1, a space in the case 3 where the electrolyte solution can move in the gap formed between the case 3 and the electrode assembly 2 becomes small compared to the case where the partition member 8 is arranged at the center position of the electrode assembly 2. With this configuration, one end 201 (one end in the X axis direction) of the electrode assembly 2 and the electrolyte solution are more easily brought into contact with each other. As a result, the poured electrolyte solution impregnates into the electrode assembly 2 more efficiently.

In the energy storage device 1 of this embodiment, the electrode assembly 2 is fixed (positioned) by the partition member 8 in the case 3. Accordingly, it is possible to prevent the electrode assembly 2 from being damaged due to vibrations or the like generated when the energy storage device 1 is used. That is, the partition member 8 also functions as a countermeasure against vibrations.

In this embodiment, the partition member 8 has elasticity, that is, the partition member 8 is elastically deformable and hence, the partition member 8 absorbs the expansion and contraction of the electrode assembly 2 caused along with charging and discharging of the energy storage device 1. Accordingly, it is possible to prevent the case 3 from being damaged due to the expansion and contraction of the electrode assembly 2.

It is needless to say that the energy storage device of the present invention is not limited to the above-mentioned embodiment, and various modifications are conceivable without departing from the gist of the present invention. For example, the configuration of another embodiment may be added to the configuration of one embodiment. Alternatively, a part of the configuration of one embodiment may be replaced with the configuration of another embodiment. Further, a part of the configuration of one embodiment may be omitted.

The specific number of partition member 8 in the energy storage device 1 is not limited. For example, although one partition member 8 is provided to the energy storage device 1 of the above-mentioned embodiment, a plurality of partition members 8 may be provided to the energy storage device 1. The plurality of partition members 8 are arranged along the X axis direction. The larger the number of partition members 8, the more surely the space (first space) 331 where one end 201 of the electrode assembly 2 is positioned and the space (second space) 332 where the other end 202 of the electrode assembly 2 is positioned can be partitioned. Further, the electrode assembly 2 is more firmly fixed in the case 3.

In the case where the plurality of partition members 8 are provided to the energy storage device 1, the electrolyte solution pouring hole 325A is formed in the case 3 at a position closer to one end of the case 3 than the partition member 8 arranged closest to one end of the case 3 is. That is, the electrolyte solution pouring hole 325A is formed in the case 3 at a position which faces the space (first space) 331 where one end 201 of the electrode assembly 2 is positioned. On the other hand, the vent hole 325B is formed in the case 3 at a position closer to the other end of the case 3 than the partition member 8 arranged closest to the other end of the case 3 is. That is, the vent hole 325B is formed in the case 3 at a position which faces the space (second space) 332 where the other end 202 of the electrode assembly 2 is positioned.

The specific position of the electrolyte solution pouring hole 325A is not particularly limited. For example, although the electrolyte solution pouring hole 325A in the above-mentioned embodiment is formed in the lid plate 32, the electrolyte solution pouring hole 325A may be formed in the case body 31. That is, it is sufficient that the electrolyte solution pouring hole 325A is formed in the case 3 at a position where the electrolyte solution pouring hole 325A communicates with the first space 331. By forming the electrolyte solution pouring hole 325A at such a position, an electrolyte solution can be poured in the first space 331 through the electrolyte solution pouring hole 325A. The specific position of the vent hole 325B is not also particularly limited. For example, although the vent hole 325B in the above-mentioned embodiment is formed in the lid plate 32, the vent hole 325B may be formed in the case body 31. That is, it is sufficient that the vent hole 325B is formed in the case 3 at a position where the vent hole 325B communicates with the second space 332. By forming the vent hole 325B at such a position, a gas (air or the like) in the second space 332 can be discharged through the vent hole 325B.

The specific arrangement position of the partition member 8 on the electrode assembly 2 is not particularly limited. For example, although the partition member 8 in the above-mentioned embodiment is arranged on the electrode assembly 2 at a position closer to one end 201 of the electrode assembly 2 than the center position of the electrode assembly 2 is in the X axis direction, the partition member 8 may be arranged at the center position of the electrode assembly 2, or may be arranged on the electrode assembly 2 at a position closer to the other end 202 of the electrode assembly 2 than the center position is. That is, it is sufficient that, in a state where the first space 331 and the second space 332 are partitioned from each other by the partition member 8, one end 201 of the electrode assembly 2 is positioned in the first space 331, and the other end 202 of the electrode assembly 2 is positioned in the second space 332.

It is not always necessary to partition a gap formed between the electrode assembly 2 and the case 3 by the partition member 8 in such a manner that a gap is formed neither between the partition member 8 and the electrode assembly 2 nor between the partition member 8 and the case 3. That is, an extremely slight gap may be formed at least one of between the partition member 8 and the electrode assembly 2 and between the partition member 8 and the case 3. When a size of the gap is sufficiently small, an electrolyte solution and a gas (air, gas or the like) minimally move to the second space 332 from the first space 331 through the gap formed between the case 3 and the electrode assembly 2. Accordingly, the electrolyte solution poured in the first space 331 can easily impregnate into the inside of the electrode assembly 2 from one end 201 (open end 203) of the electrode assembly and can easily move to the other end 202 (toward the second space 332) through the inside of the electrode assembly 2.

Although the partition member 8 is made of a non-porous material in the above-mentioned embodiment, a material for forming the partition member 8 is not limited to the above-mentioned material. It is sufficient that the partition member 8 is formed by using a material which allows a minimum permeation of an electrolyte solution.

Although the partition member 8 has elasticity in the above-mentioned embodiment, the partition member 8 is not limited to such a configuration, and the partition member 8 may not have elasticity. In this case, to prevent the electrode assembly 2 and the case 3 from being damaged when the electrode assembly 2 expands or contracts along with charging and discharging, it is preferable to form a slight gap between the partition member 8 and the case 3.

The specific electrolyte solution pouring posture of the case 3 at the time of manufacturing the energy storage device 1 is not particularly limited. For example, although the electrolyte solution pouring posture of the case 3 is such that the X axis direction (the winding axis direction) of the electrode assembly 2 is directed in the vertical direction in the method of manufacturing an energy storage device 1 of the above-mentioned embodiment, the electrolyte solution pouring posture of the case 3 may be set such that the X axis direction of the electrode assembly 2 is directed in the horizontal direction or in the approximately horizontal direction. Even when the case 3 takes the electrolyte solution pouring posture where the X axis direction of the electrode assembly 2 is directed in the horizontal direction or in the approximately horizontal direction, a gap formed between the case 3 and the electrode assembly 2 is partitioned by the partition member 8 and hence, an electrolyte solution poured in the first space 331 impregnates into the electrode assembly 2 from one end 201 of the electrode assembly 2, and moves toward the other end 202 (second space 332) through the inside of the electrode assembly 2. With this configuration, a gas which is present between the electrodes 23, 24 and the separator 25 before an electrolyte solution is poured in the case 3 is discharged from the other end 202 of the electrode assembly 2 such that the gas is pushed out by the impregnated electrolyte solution and hence, the gas minimally remains in the inside of the electrode assembly 2 when the electrolyte solution impregnates into the whole electrode assembly 2.

It is preferable to adopt an electrolyte solution pouring posture where the electrolyte solution pouring hole 325A is positioned below the vent hole 325B. By adopting such an electrolyte solution pouring posture, the first space 331 in the case 3 in which the electrolyte solution is poured is positioned below the second space 332 in the case 3 which is partitioned from the first space 331 by the partition member 8. Accordingly, the poured electrolyte solution is easily collected to an area in the vicinity of one end 201 of the electrode assembly 2 due to gravity of the electrolyte solution and hence, it is possible to make the electrolyte solution efficiently impregnate into the electrode assembly 2.

Figure 9:
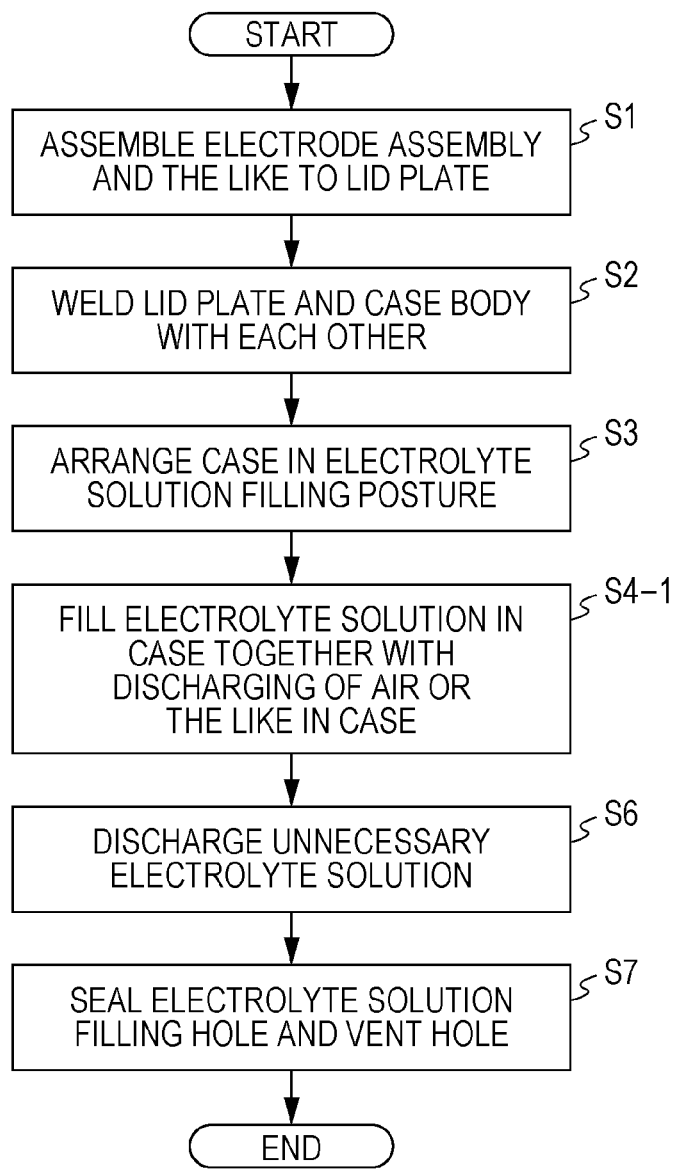
FIG. 9 is a flowchart describing a method of manufacturing an energy storage device according to another embodiment.

In the above-mentioned embodiment, an electrolyte solution is poured in the case 3 after air or the like is discharged from the case 3 (see step S4 in the above-mentioned embodiment) so that the inside of the case 3 is brought into a low pressure state (see step S5 in the above-mentioned embodiment). However, as shown in FIG. 9, discharging of a gas in the case 3 through the vent hole 325B and pouring of an electrolyte solution in the case 3 through the electrolyte solution pouring hole 325A may be simultaneously performed (step S4-1). In this case, steps S1 to S3, S6 and S7 are performed in the same manner as the above-mentioned embodiment. Also with this configuration, a pressure in the second space 332 can be made smaller than a pressure in the first space 331 in the case 3 at the time of pouring an electrolyte solution and hence, it is possible to make the electrolyte solution efficiently impregnate into the electrode assembly (the whole electrode assembly) toward the other end 202 from one end 201 of the electrode assembly 2. That is, a pressure difference is generated between the first space 331 and the second space 332, and the electrolyte solution can be more efficiently made to impregnate into the electrode assembly 2 toward the other end 202 from one end 201 of the electrode assembly 2 by making use of the pressure difference.

In the above-mentioned embodiment, the inside of the case 3 is brought into a low pressure state by discharging a gas through the vent hole 325B (see step S4 in the above-mentioned embodiment). However, the inside of the case 3 may not be brought into a low pressure state by discharging a gas. In this case, a pressure in the second space 332 may be reduced by discharging a gas through the vent hole 325B such that a pressure in the second space 332 becomes smaller than a pressure in the first space 331. Provided that the pressure in the second space 332 is smaller than the pressure in the first space 331, the pressure in the second space 332 may be set larger than an atmospheric pressure.

Also with this configuration, in the case 3, a pressure in the second space 332 can be set smaller than a pressure in the first space 331 at the time of pouring an electrolyte solution and hence, it is possible to make an electrolyte solution efficiently impregnate into the electrode assembly 2 (the whole electrode assembly) toward the other end 202 from one end 201 of the electrode assembly 2. That is, a pressure difference is generated between the first space 331 and the second space 332, and an electrolyte solution can be more efficiently made to impregnate into the electrode assembly 2 toward the other end 202 from one end 201 of the electrode assembly 2 by making use of the pressure difference.

In this case, pouring of an electrolyte solution may be performed together with the reduction of the pressure, or may be performed after the reduction of the pressure.

Although the electrolyte solution pouring hole 325A and the vent hole 325B are formed in the case 3 of the above-mentioned embodiment, the present invention is not limited to such a configuration. The vent hole 325B may not be formed in the case 3 and all portions of the case 3 except for the electrolyte solution pouring hole 325A may have the airtight structure. In this case, a pressure in the case 3 is reduced or the inside of the case 3 is brought into a negative pressure (see step S4 in the above-mentioned embodiment) by discharging a gas through the electrolyte solution pouring hole 325A. Here, due to a pressure difference which is generated between the first space 331 and the second space 332 when a pressure in the first space 331 is reduced by discharging a gas from the first space 331, a gas (air or the like) in the second space 332 moves to the first space 331 through the inside of the electrode assembly 2, and is discharged through the electrolyte solution pouring hole 325A. With this configuration, it is no more necessary to provide the vent hole 325B for bringing the inside of the case 3 into a negative pressure by discharging a gas and the vent plug 326B for sealing the vent hole 325B after discharging the gas and hence, the number of parts can be reduced and, at the same time, it is possible to omit an operation of sealing the vent hole 325B by welding the vent plug 326B to the case 3 after discharging a gas.

Although the discharging of a gas through the vent hole 325B is continued during the pouring of an electrolyte solution in the method of manufacturing the energy storage device 1 of the above-mentioned embodiment, the discharging of a gas through the vent hole 325B may be stopped during the pouring of the electrolyte solution. Also in this case, a volume of the first space 331 in the case 3 in which an electrolyte solution is poured becomes small by an amount of a volume of the poured electrolyte solution and hence, a pressure difference is generated between the first space 331 and the second space 332 in the case 3 which is partitioned by the partition member 8. Accordingly, it is possible to make an electrolyte solution efficiently impregnate into the electrode assembly 2 from one end 201 of the electrode assembly 2.

One gas release vent 321 is provided to the case 3 in the energy storage device 1 of the above-mentioned embodiment. However, the present invention is not limited to such a configuration, and a plurality of gas release vents 321 may be provided to the case 3. In this case, it is preferable that the gas release vents 321 be arranged at positions which face spaces (divided spaces) in the case 3 which are partitioned by one or a plurality of partition members 8 respectively. To be more specific, for example, when the inner space 33 of the case 3 is divided into two spaces (regions) consisting of the first space 331 and the second space 332, the case 3 includes a gas release vent 321 which faces the first space 331 and a gas release vent 321 which faces a second space 332. With this configuration, even when a pressure in either one of the divided spaces is excessively increased, the pressure in the divided space where the pressure is excessively increased can be lowered by the corresponding gas release vent 321.

Figure 10:
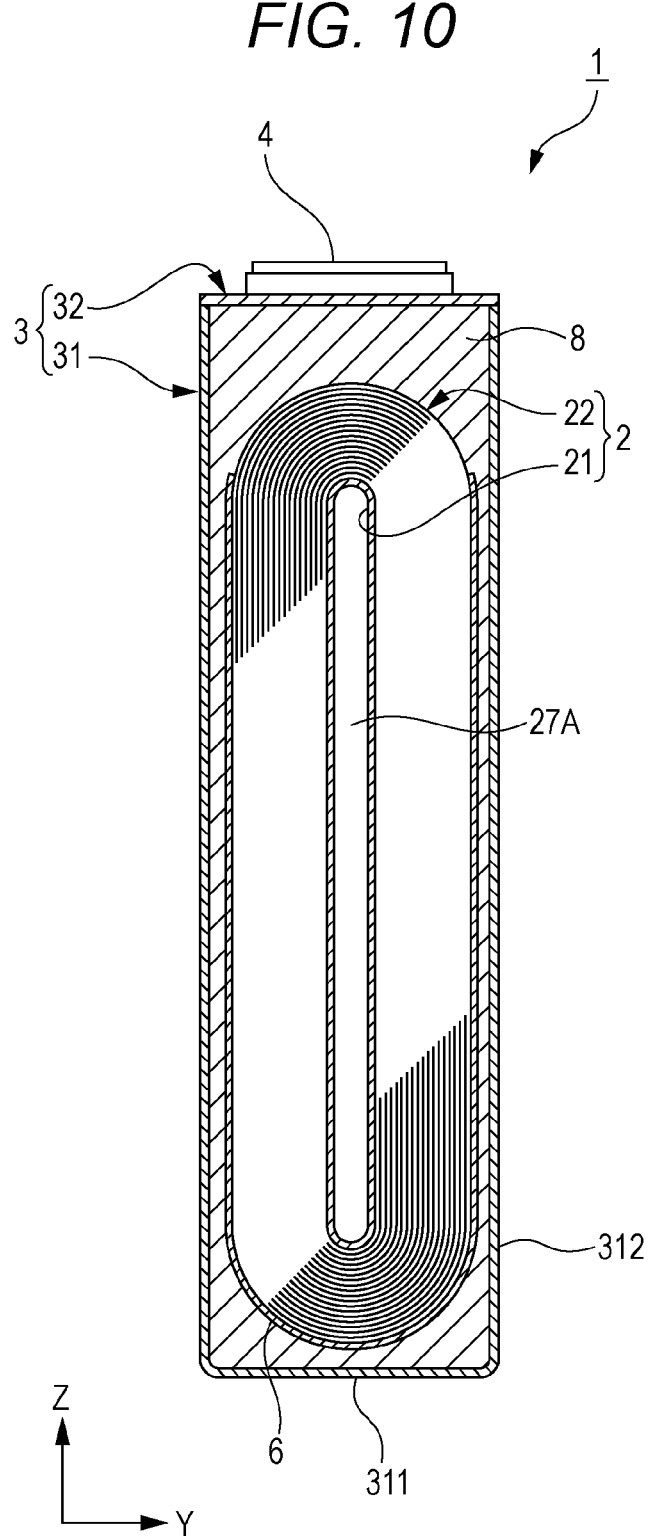
FIG. 10 is a longitudinal cross-sectional view of an energy storage device according to another embodiment.

Although the electrode assembly 2 in the above-mentioned embodiment does not include a winding core, the present invention is not limited to such a configuration. As shown in FIG. 10, the electrode assembly 2 may include a winding core 21. In this case, the electrode assembly 2 is formed by winding a layered product 22 constituted of a positive electrode 23, a negative electrode 24 and a separator 25 around the winding core 21. That is, the electrode assembly 2 includes the winding core 21 and the layered product 22. When the winding core 21 is formed into a hollow cylindrical shape thus having a hollow portion, it is preferable that the winding core 21 include a partition portion 27A which partitions the hollow portion in the winding axis direction (X axis direction). In this case, the hollow portion of the winding core 21 is communicated with the outside in the winding axis direction (X axis direction). That is, the winding core 21 is formed into a so-called hollow cylindrical shape, and includes the partition portion 27A which partitions the hollow portion in the winding axis direction (X axis direction) at any position in the hollow portion in the X axis direction.

In the above-mentioned embodiment, the description has been made with respect to the case where the energy storage device is the chargeable/dischargeable nonaqueous electrolyte secondary battery (for example, lithium ion secondary battery). However, a type and a size (capacities) of an energy storage device can be desirably selected. Further, in the above-mentioned embodiment, the description has been made with respect to the lithium ion secondary battery as one example of the energy storage device. However, the present invention is not limited to the lithium ion secondary battery. For example, the present invention is also applicable to various secondary batteries, primary batteries, and energy storage devices of capacitors such as electric double layer capacitors.

Figure 11:
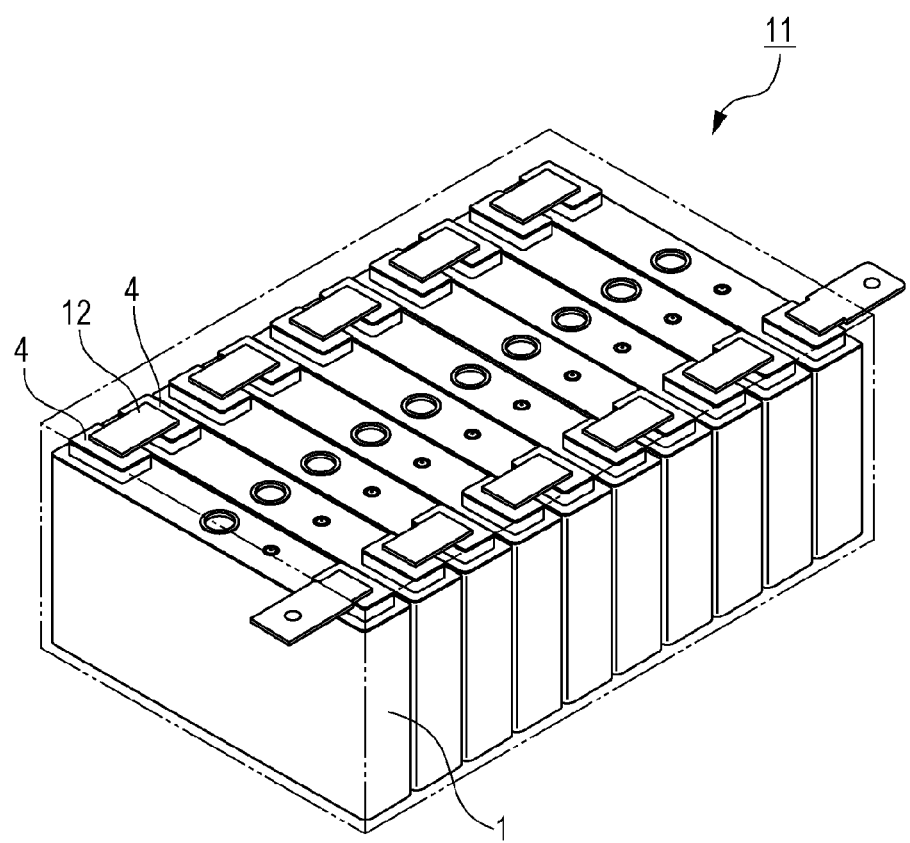
FIG. 11 is a perspective view of an energy storage apparatus including the energy storage devices according to the embodiment.

The energy storage device (for example, battery) may be used in an energy storage apparatus (a battery module when an energy storage device is a battery) 11 shown in FIG. 11. The energy storage apparatus 11 includes at least two energy storage devices 1 and a bus bar member 12 which electrically connects two (different) energy storage devices 1 with each other. In this case, it is sufficient that the technique of the present invention is applied to at least one of the two energy storage devices 1.

The partition member 8 may be formed in a plate shape by combining a plurality of pieces. A partition member 8 shown in FIG. 12A is formed into a plate shape by combining four pieces consisting of: a pair of side pieces which faces straight-line portions of an electrode assembly 2 as viewed in cross section; a lower piece which is arranged on an inner surface of a bottom wall of a case body 31; and an upper piece which is arranged on an inner surface of a lid plate 32 of a case 3. A partition member 8 shown in FIG. 12B is divided into two pieces at a center point in the Y axis direction as viewed in cross section. A partition member shown in FIG. 12C is formed into a plate shape by combining two pieces consisting of: a U-shaped piece which covers a distal end of an electrode assembly 2 when the electrode assembly 2 is inserted into a case body 31; and an upper piece.

What is claimed is:

1. An energy storage device, comprising:
   an electrode assembly formed by winding electrodes and a separator in a layered state;
   a case for storing the electrode assembly therein, the case including an electrolyte solution sealing portion where an electrolyte solution pouring hole formed in the case is sealed; and
   a partition member arranged in a gap formed between the case and the electrode assembly stored in the case,
   wherein the partition member partitions the gap in an axial direction of the electrode assembly by surrounding the electrode assembly in a circumferential direction of the electrode assembly,
   wherein, in the axial direction, the electrolyte solution pouring hole is arranged at a position closer to an end of the electrode assembly than the partition member,
   wherein, in the axial direction, the partition member is located between the end of the electrode assembly and another end of the electrode assembly,
   wherein the case comprises a lid plate, the electrolyte solution pouring hole being located on a top surface of the lid plate, and
   wherein, in a cross sectional view, in a direction perpendicular to the top surface of the lid plate, the partition member fills the gap between the lid plate and the electrode assembly.

2. The energy storage device according to claim 1, wherein the case includes a gas discharge sealing portion where a vent hole formed in the case is sealed, and
   wherein, in the axial direction, the vent hole is formed at a position closer to said another end of the electrode assembly than the partition member.

3. The energy storage device according to claim 1, wherein the partition member is non-porous.

4. The energy storage device according to claim 1, wherein, in the axial direction, the partition member is arranged on the electrode assembly at a position outside a center position of the electrode assembly.

5. The energy storage device according to claim 1, wherein the electrode assembly includes a winding core which includes a hollow portion, and has a peripheral surface around which the electrodes and the separator are wound, and
   wherein the Winding core includes a partition portion which partitions the hollow portion in the axial direction.

6. The energy storage device according to claim 1, wherein the case has a rectangular parallelepiped shape, and a wall surface of the case to which the electrolyte solution sealing portion is provided extends approximately parallel to the axial direction of the electrode assembly.

7. The energy storage device according to claim 1, wherein the partition member is formed into a plate shape by combining a plurality of pieces.

8. The energy storage device according to claim 1, wherein, in the axial direction, an entirety of the partition member is located between the end of the electrode assembly and said another end of the electrode assembly.

9. The energy storage device according to claim 1, wherein, in the axial direction, the electrode assembly is located on opposite sides of the partition member.

10. The energy storage device according to claim 1, wherein, in the axial direction, the partition member is completely located outside the end of the electrode assembly and said another end of the electrode assembly.

11. The energy storage device according to claim 1, wherein, in a radial direction of the electrode assembly, the partition member completely overlaps with the electrode assembly.

12. An energy storage device, comprising:
an electrode assembly including winding electrodes and a separator in a layered state;
a case for storing the electrode assembly therein, the case including an electrolyte solution sealing portion where an electrolyte solution pouring hole formed in the case is sealed; and
a partition member arranged in a gap formed between the case and the electrode assembly stored in the case,
wherein the partition member partitions the gap in an axial direction of the electrode assembly by surrounding the electrode assembly in a circumferential direction of the electrode assembly,
wherein the electrode assembly penetrates the partition member,
wherein the case comprises a lid plate, the electrolyte solution pouring hole being located on a top surface of the lid plate, and
wherein, in a cross sectional view, in a direction perpendicular to the top surface of the lid plate, the partition member fills the gap between the lid plate and the electrode assembly.

13. The energy storage device according to claim 12, wherein, in the axial direction, the electrolyte solution pouring hole is arranged at a position closer to an end of the electrode assembly than the partition member.

14. The energy storage device according to claim 12, wherein, in the axial direction, the electrode assembly is located on opposite sides of the partition member.

15. The energy storage device according to claim 12, wherein, in a cross-sectional view, the electrode assembly extends on opposite sides of the partition member and is exposed outside the partition member on the opposite sides of the partition member.

16. The energy storage device according to claim 12, wherein, in a radial direction of the electrode assembly, the partition member completely overlaps with the electrode assembly.

17. An energy storage device, comprising:
an electrode assembly including winding electrodes and a separator in a layered state;
a case for storing the electrode assembly therein, the case including an electrolyte solution sealing portion where an electrolyte solution pouring hole formed in the case is sealed; and
a partition member arranged in a gap formed between the case and the electrode assembly stored in the case,
wherein the partition member partitions the gap in an axial direction of the electrode assembly by surrounding the electrode assembly in a circumferential direction of the electrode assembly,
wherein the case comprises a lid plate, the electrolyte solution pouring hole being located on a top surface of the lid plate, and
wherein, in a cross sectional view, in a direction perpendicular to the top surface of the lid plate, the partition member fills the gap between the lid plate and the electrode assembly.

18. The energy storage device according to claim 17, wherein, in a radial direction of the electrode assembly, the partition member completely fills the gap between the case and the electrode assembly.

* * * * *